United States Patent
Lin et al.

(10) Patent No.: US 9,069,419 B2
(45) Date of Patent: Jun. 30, 2015

(54) OBJECT POSITIONING FOR AN X-Y PROJECTED CAPACITIVE TOUCH PANEL

(75) Inventors: Chia-Hsing Lin, Hsinchu (TW); Yi-Hsin Tao, Hsinchu (TW); Hung Nien, Hsinchu (TW); Brian Sung, Taipei (TW); Hsin-Shieh Tsai, Changhua County (TW); Hsuan-Wen Tseng, Taipei County (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 540 days.

(21) Appl. No.: 12/869,114

(22) Filed: Aug. 26, 2010

(65) Prior Publication Data
US 2011/0050614 A1    Mar. 3, 2011

(30) Foreign Application Priority Data
Aug. 28, 2009 (TW) .............................. 98129042 A

(51) Int. Cl.
G06F 3/041    (2006.01)
G06F 3/044    (2006.01)

(52) U.S. Cl.
CPC .............. G06F 3/044 (2013.01); G06F 3/0416 (2013.01); *G06F 2203/04104* (2013.01)

(58) Field of Classification Search
CPC ............................ G06F 21/6218; G06F 3/044
USPC ................. 345/173–174, 176, 178; 178/180.01–18.11
See application file for complete search history.

(56) References Cited

U.S. PATENT DOCUMENTS

| | | | | |
|---|---|---|---|---|
| 5,825,352 A * | 10/1998 | Bisset et al. | | 345/173 |
| 6,459,424 B1 * | 10/2002 | Resman | | 345/173 |
| 6,492,979 B1 * | 12/2002 | Kent et al. | | 345/173 |
| 2006/0038791 A1 * | 2/2006 | Mackey | | 345/173 |
| 2006/0288313 A1 | 12/2006 | Hillis | | |
| 2007/0291012 A1 | 12/2007 | Chang | | |
| 2008/0150906 A1 * | 6/2008 | Grivna | | 345/173 |
| 2008/0158174 A1 * | 7/2008 | Land et al. | | 345/173 |
| 2010/0066701 A1 * | 3/2010 | Ningrat | | 345/174 |
| 2010/0079384 A1 * | 4/2010 | Grivna | | 345/173 |

FOREIGN PATENT DOCUMENTS

TW    200802058 A    1/2008

OTHER PUBLICATIONS

Communication from the Taiwan Patent Office regarding a counterpart foreign application dated (Taiwan year 102) May 20, 2013.

* cited by examiner

*Primary Examiner* — Kent Chang
*Assistant Examiner* — Scott Au
(74) *Attorney, Agent, or Firm* — Muncy, Geissler, Olds & Lowe, P.C.

(57) ABSTRACT

Methods are proposed for object positioning for an X-Y projected capacitive touch panel. In an embodiment, capacitance sensing under inphase excitation of traces is applied to set a base value when the capacitive touch panel is not touched and to obtain capacitances at intersections when the capacitive touch panel is touched, and the base value is compared with the measured capacitances to identify touch points. In other embodiments, X-Y projected sensing and all-point sensing are combined to reduce the amount of calculation and achieve the same positioning effect as an all-point capacitive touch panel.

2 Claims, 13 Drawing Sheets

OBJECT POSITIONING FOR AN X-Y PROJECTED CAPACITIVE TOUCH PANEL

FIELD OF THE INVENTION

The present invention is related generally to a capacitive touch panel and, more particularly, to positioning methods for a two-dimensional capacitive touch panel.

BACKGROUND OF THE INVENTION

Capacitive touch panels can be divided by their trace arrangements and positioning methods into the all-point type and the two-dimensional type. An all-point capacitive touch panel includes a plurality of discrete sensors arranged in a matrix and connected to a detector circuit via their respective independent traces. Such a capacitive touch panel, though capable of yielding precise positional information of objects placed thereon, is disadvantaged by high costs and a huge amount of data calculation resulted from the large number of sensors and traces used.

On the other hand, a two-dimensional capacitive touch panel, also known as an X-Y projected capacitive touch panel, as shown in FIG.FIG. 1, includes sensors composed of intersecting X-traces and Y-traces, and an X-Y projected sensing circuit can be used to convert the capacitance variations measured from the X-traces and Y-traces into digital information and thereby generate measured values along X-axis and Y-axis for object positioning for the capacitive touch panel. There are self-capacitance on each X-trace, self-capacitance on each Y-trace, and mutual capacitance between an X-trace and a Y-trace intersecting to each other, which will be influenced when a conductor approaches thereto. As shown in FIG.FIG. 2, the positioning method of such a capacitive touch panel is carried out by sequentially sensing the capacitance variations of the X-traces and Y-traces, identifying the X-axis position $X_1$ and the Y-axis position $Y_1$ of a finger 10 separately, and combining the X-axis position $X_1$ and the Y-axis position $Y_1$ into coordinates $(X_1,Y_1)$ for the touch point. For single-finger applications, this positioning method can rapidly generate the coordinates of the finger 10 with a relatively small amount of calculation. For multi-finger applications, however, this positioning method may cause ghost point phenomenon. For example, referring to FIG.FIG. 3, when fingers 12 and 14 simultaneously touches an X-Y projected capacitive touch panel, there will be sensed significant capacitance variations at positions $X_1, X_2, Y_1$ and $Y_2$, thereby resulting in four touch points $(X_1,Y_1)$, $(X_1,Y_2)$, $(X_2,Y_1)$ and $(X_2,Y_2)$, of which $(X_1,Y_1)$ and $(X_2,Y_2)$ are ghost points, i.e., points that are not actually touched. Because of the ghost point phenomenon, the sensing circuit of an X-Y projected capacitive touch panel can not correctly identify the real points of the fingers.

The conventional all-point and X-Y projected capacitive touch panels have their own advantages and drawbacks. The X-Y projected sensing circuit measures the difference of self-capacitance lumped on X-traces and Y-traces, and has high frame rate and low power consumption, but is bothered by ghost point phenomenon. The all-point sensing circuit measures the difference of mutual capacitance between X-traces and Y-traces, and is multi-finger ghost free, but has low frame rate and high power consumption. The present invention provides positioning methods for carrying out all-point sensing on an X-Y projected capacitive touch panel, and combines the positioning methods with the conventional X-Y projected sensing to reduce the amount of calculation to provide complete positional information and eliminate the ghost point problem associated with the X-Y projected capacitive touch panels.

SUMMARY OF THE INVENTION

An object of the present invention is to provide positioning methods for an X-Y projected capacitive touch panel.

According to the present invention, an X-Y projected capacitive touch panel includes three traces with two intersections between the first and second traces and between the first and third traces respectively, and a positioning method for the X-Y projected capacitive touch panel senses the first trace under inphase excitation of the first and second traces to obtain a first measured capacitance in a first state, sets a base value according to the first measured capacitance, senses the first trace under inphase excitation of the first and second traces to obtain a second measured capacitance in a second state, senses the first trace under inphase excitation of the first and third traces to obtain a third measured capacitance in the second state, and compares the base value with the second and third measured capacitances respectively, to identify a touched position. The X-Y projected capacitive touch panel is not touched in the first state and is touched in the second state.

According to the present invention, an X-Y projected capacitive touch panel includes a plurality of first traces in a first direction and a plurality of second traces in a second direction, and a positioning method for the X-Y projected capacitive touch panel includes sequentially sensing the first traces and the second traces to generate an X-Y projected sensed frame, inphase crisscross sensing of the first traces and the second traces to generate an all-point sensed frame, and obtaining touch information of the X-Y projected capacitive touch panel according to the X-Y projected sensed frame and the all-point sensed frame.

According to the present invention, an X-Y projected capacitive touch panel includes a plurality of first traces in a first direction and a plurality of second traces in a second direction, and a positioning method for the X-Y projected capacitive touch panel sequentially performs the steps of (a) sequential sensing of the first traces and the second traces to obtain X-Y projected sensing information, (b) object number resolution for identifying an object number to be compared with one, (c) returning to the step (a) if the object number is less than or equal to one, (d) sequential inphase crisscross excitation of the first traces and the second traces for sensing of the first traces and the second traces to obtain all-point sensing information, if the object number is greater than one, (e) object number resolution for identifying the object number to be compared with one, (f) returning to the step (a) if the object number is less than or equal to one, and (g) returning to the step (d) if the object number is greater than one.

According to the present invention, an X-Y projected capacitive touch panel includes a plurality of first traces in a first direction and a plurality of second traces in a second direction, and a positioning method for the X-Y projected capacitive touch panel sequentially performs the steps of (a) sequential sensing of the first traces and the second traces to obtain X-Y projected sensing information, (b) identification of whether or not a ghost point phenomenon is present according to the X-Y projected sensing information, (c) returning to the step (a) if no ghost point phenomenon is present, and (d) sequential inphase crisscross excitation of a portion of first traces and a portion of second traces near the ghost point phenomenon for sensing of the portion of first traces and the portion of second traces to obtain all-point sensing information corresponding to the portion of first traces and the portion of second traces to eliminate the ghost point phenomenon, if the ghost point phenomenon is present.

The present invention combines the advantages of both X-Y projected and all-point sensing to achieve higher frame rate and lower power consumption than pure all-point sensing, and multi-finger ghost free compared to pure X-Y projected sensing.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
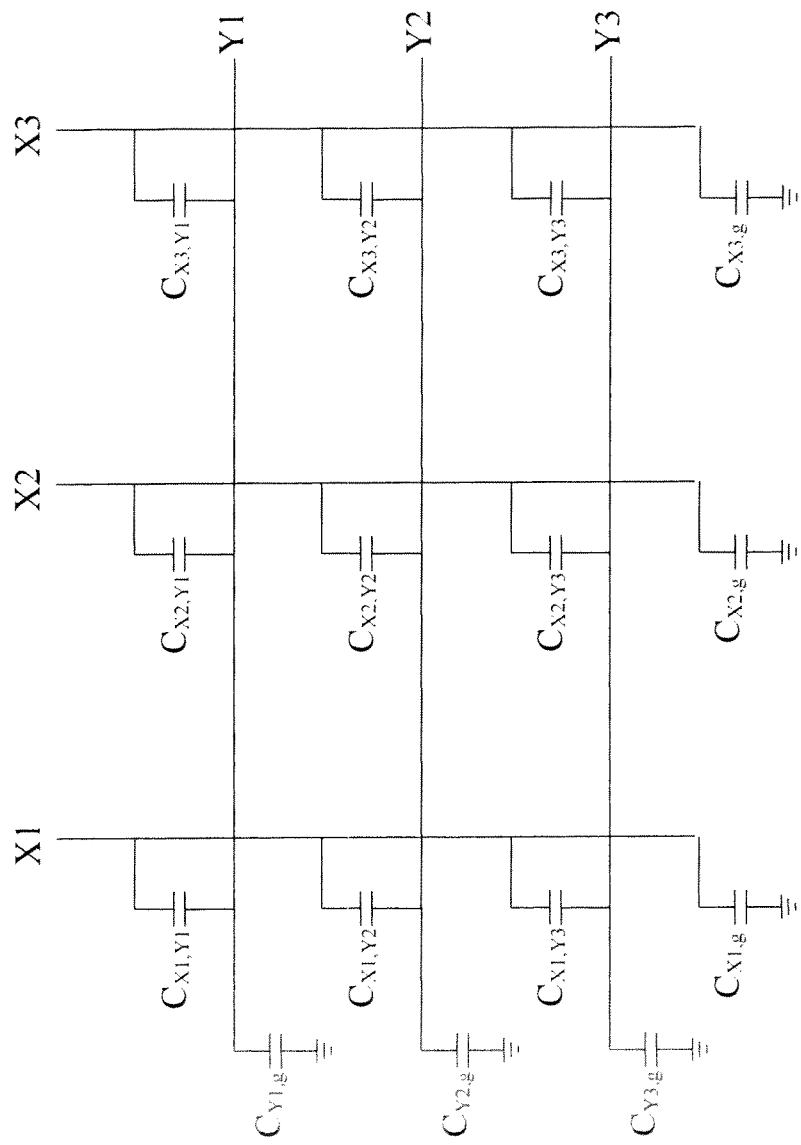
FIG. 1 is a circuit diagram of an X-Y projected capacitive touch panel without being touched.

Referring to FIG.FIG. 1, when an X-Y projected capacitive touch panel having X-traces X1, X2 and X3 and Y-traces Y1, Y2, and Y3 is not touched, the traces X1, X2 and X3 have the capacitances $$C_{X1,no\_finger}=C_{X1,g}+C_{X1,Y1}+C_{X1,Y2}+C_{X1,Y3}, \quad \text{[Eq-1]}$$

$$C_{X2,no\_finger}=C_{X2,g}+C_{X2,Y1}+C_{X2,Y2}+C_{X2,Y3}, \quad \text{[Eq-2]}$$

$$C_{X3,no\_finger}=C_{X3,g}+C_{X3,Y1}+C_{X3,Y2}+C_{X3,Y3}, \quad \text{[Eq-3]}$$

where $C_{X1,g}$ is the coupling capacitance between the trace X1 and ground, $C_{X1,Y1}$, $C_{X1,Y2}$ and $C_{X1,Y3}$ are the coupling capacitances between the trace X1 and the traces Y1, Y2, and Y3, respectively, and so forth. If the trace X1 is sensed for capacitance under the intersecting traces X1 and Y1 simultaneously excited by inphase signals, due to the traces X1 and Y1 at a same potential, the coupling capacitance $C_{X1,Y1}$ between the traces X1 and Y1 will be canceled and thus can not be sensed from the trace X1, thereby resulting in the measured capacitance $$C_{X1,no\_finger(Y1)} \approx C_{X1,no\_finger}-C_{X1,Y1}=C_{X1,g}+C_{X1,Y2}+C_{X1,Y3}. \quad \text{[Eq-4]}$$

Figure 2:
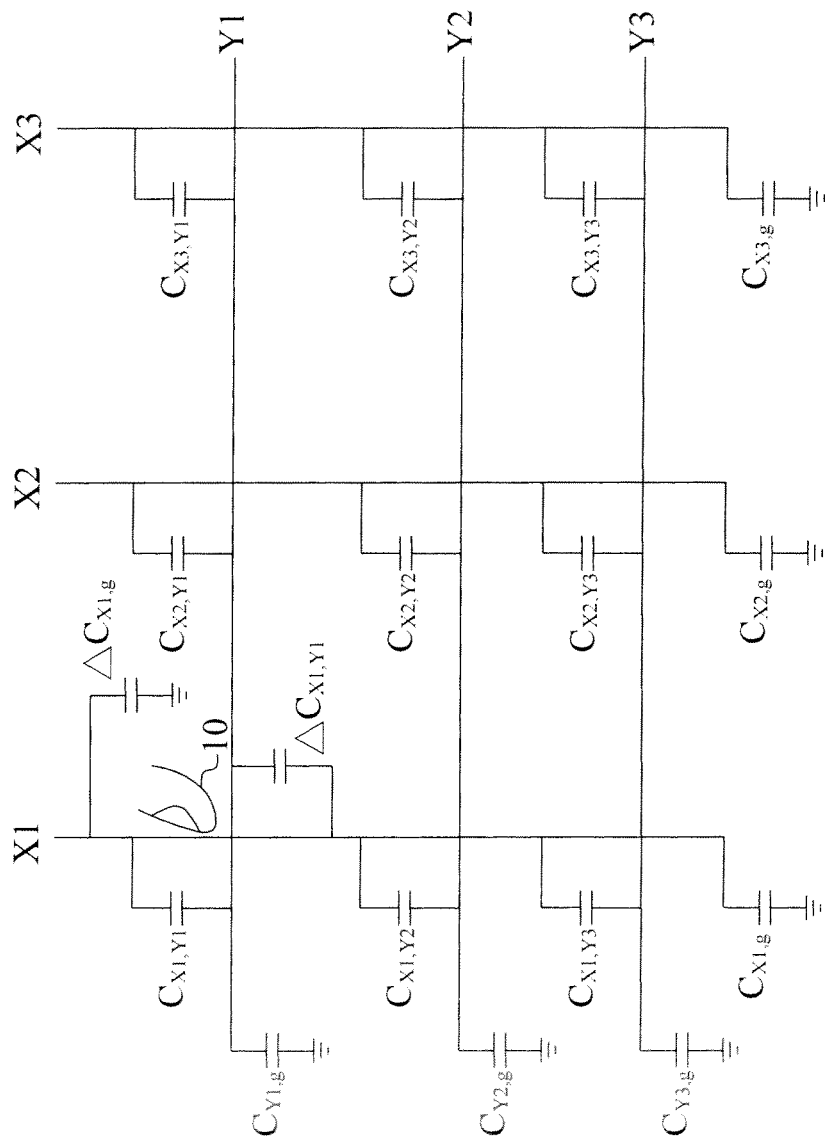
FIG. 2 is a circuit diagram of an X-Y projected capacitive touch panel under being touched.
Figure 3:
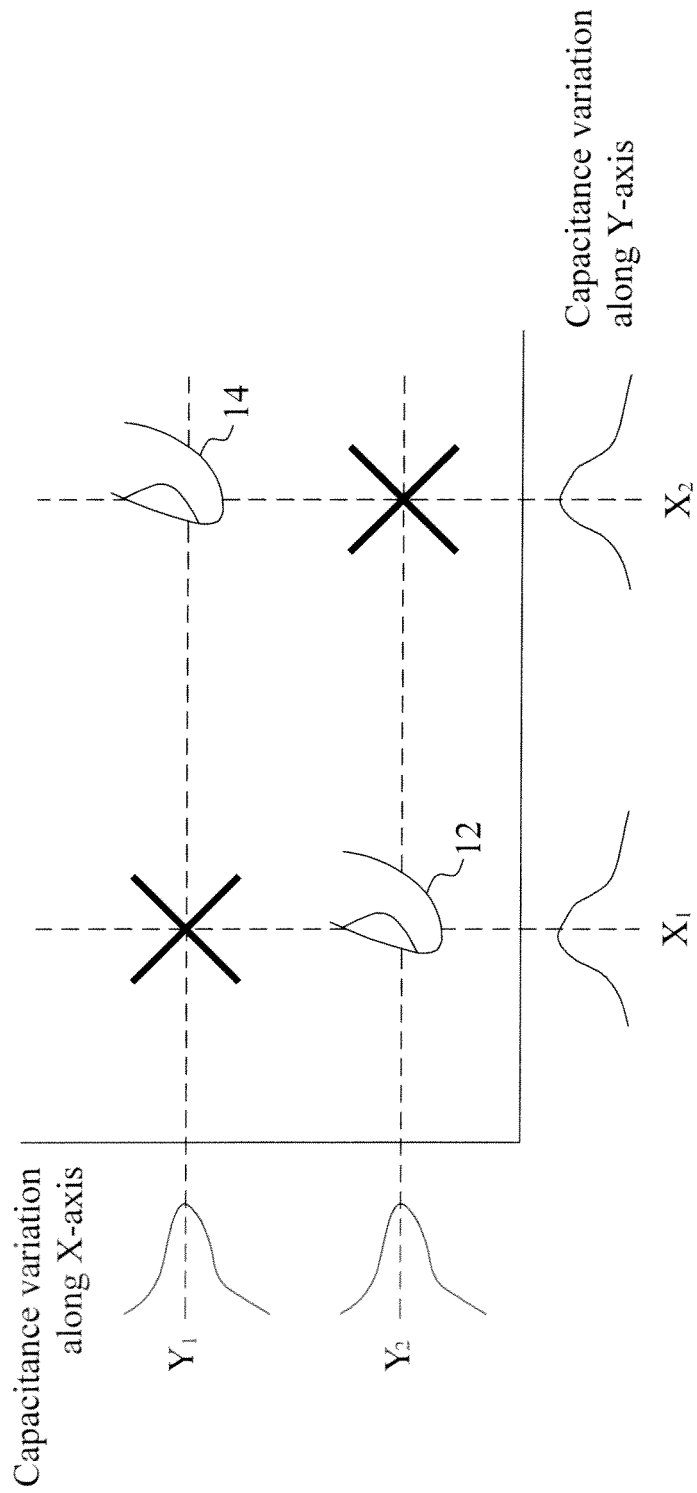
FIG. 3 schematically shows a ghost point phenomenon of an X-Y projected capacitive touch panel.
Figure 4:
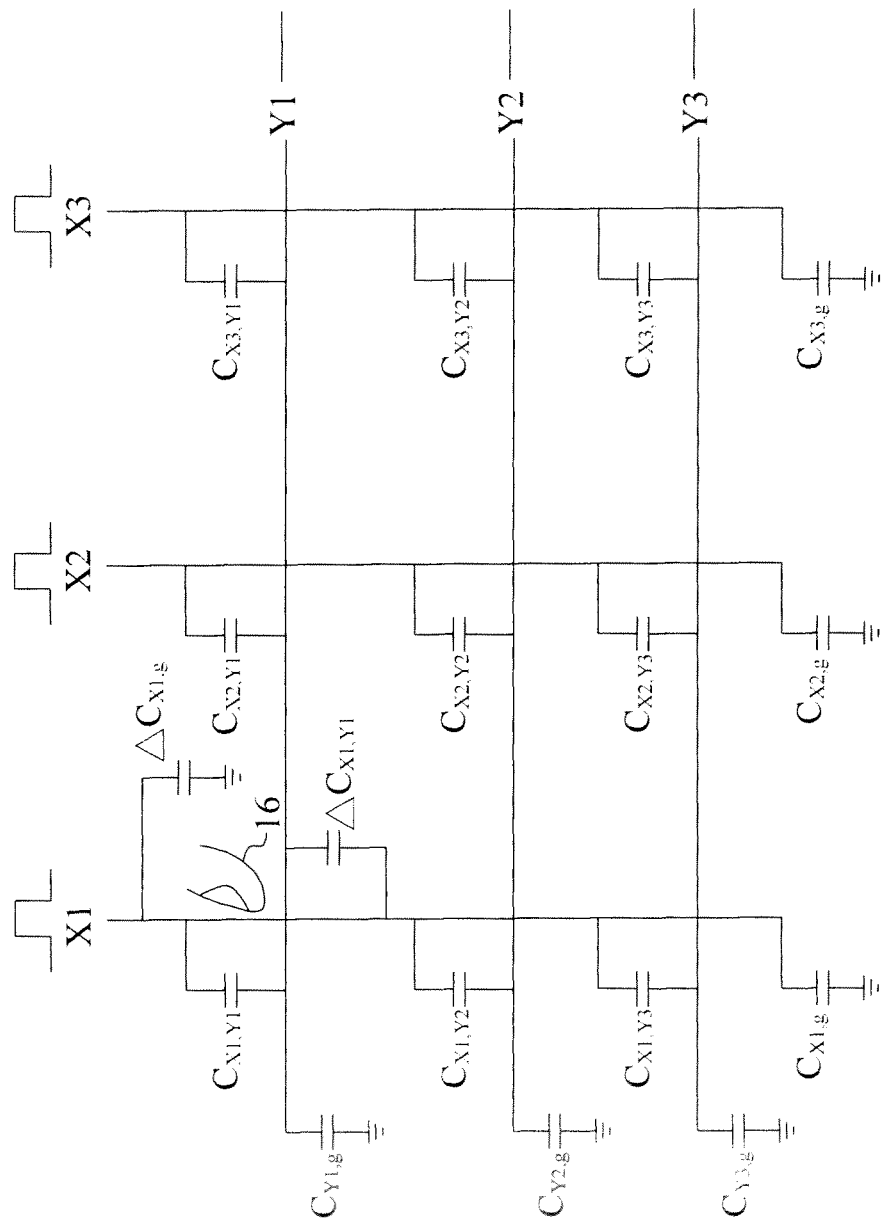
FIG. 4 is a circuit diagram of an X-Y projected capacitive touch panel under being sensed for capacitance in a state where an intersection of two traces is touched.

On the other hand, referring to FIG.FIG. 2, when a finger 10 touches the intersection (X1,Y1) of the traces X1 and Y1, capacitance variations $\Delta C_{X1,g}$ and $\Delta C_{X1,Y1}$ present, where $\Delta C_{X1,g}>0$ and $\Delta C_{X1,Y1}<0$. As shown in FIG.FIG. 4, when a finger 16 touches the intersection (X1,Y1) of the traces X1 and Y1, if the traces Y1, Y2 and Y3 are grounded and the traces X1, X2 and X3 are sequentially charged and sensed, the traces X1, X2 and X3 will have the measured capacitances $$C_{X1,finger\_on\_X1}=C_{X1,g}+C_{X1,Y1}+C_{X1,Y2}+C_{X1,Y3}+\Delta C_{X1,g}+\Delta C_{X1,Y1}, \quad \text{[Eq-5]}$$

$$C_{X2,finger\_on\_X1}=C_{X2,g}+C_{X2,Y1}+C_{X2,Y2}+C_{X2,Y3}, \quad \text{[Eq-6]}$$

$$C_{X3,finger\_on\_X1}=C_{X3,g}+C_{X3,Y1}+C_{X3,Y2}+C_{X3,Y3}, \quad \text{[Eq-7]}$$

where $|\Delta C_{X1,g}|>|\Delta C_{X1,Y1}|$, and thus $C_{X1,finger\_on\_X1}>C_{X1,no\_finger(Y1)}$, and the capacitances of the traces X2 and X3 are not affected by the finger 16 and remain at their original values.

Figure 5:
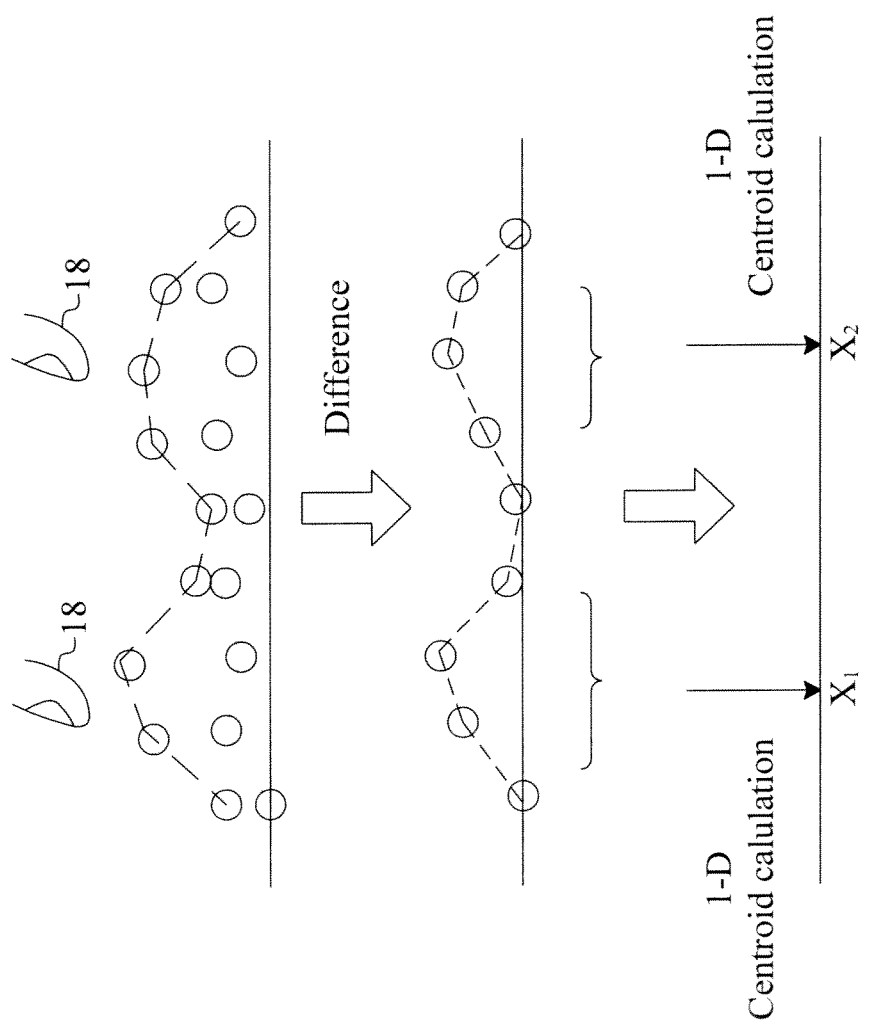
FIG. 5 schematically shows the difference between a base value and a measured capacitance from a trace used to identify finger touch on the trace.

According to the equations Eq-4 and Eq-5, under simultaneously charging the traces X1 and Y1, the measured capacitance $C_{X1,no\_finger(Y1)}$ in the state where the capacitive touch panel is not touched (hereinafter referred to as the untouched state) will be smaller than the measured capacitance $C_{X1,finger\_on\_X1}$ in the state where the intersection (X1,Y1) is touched. Therefore, a base value for use in subsequent calculation and judgment is set according to the measured capacitance $C_{X1,no\_finger(Y1)}$ under inphase crisscross excitation of the traces X1 and Y1 in the untouched state. Referring to FIG.FIG. 5, the difference between the base value and a measured capacitance from a trace can be used to identify finger touch on the trace, and to be converted into measurement values for subsequent processing and coordinate calculation.

Figure 6:
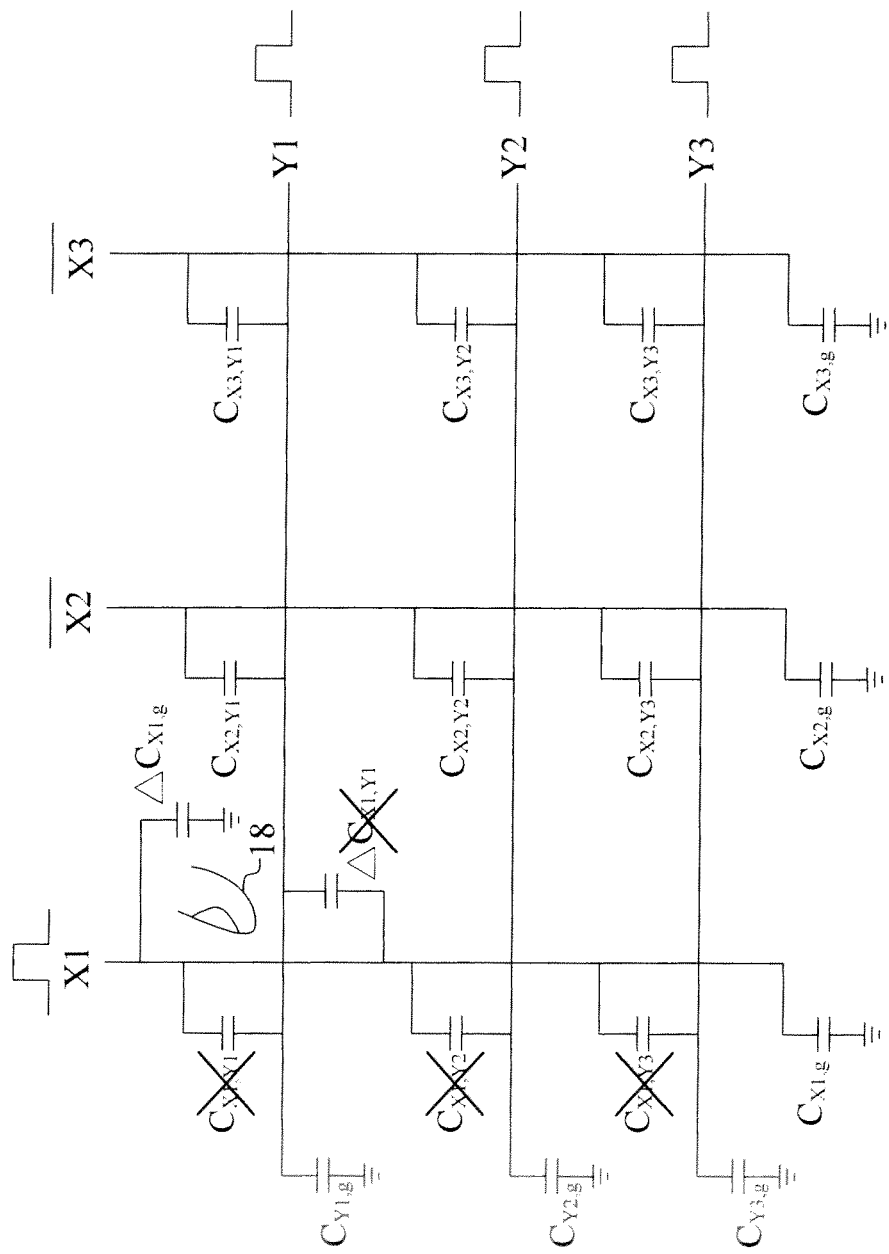
FIG. 6 is a circuit diagram of an X-Y projected capacitive touch panel with single-finger touch under being sensed for capacitance by in-phase crisscross excitation.

Next, as shown in FIG.FIG. 6, the trace X1 is sensed for capacitance under inphasely exciting the traces X1 and Y1 touched by a finger 18. Since the traces X1 and Y1 are equipotential, $C_{X1,Y1}$ and $\Delta C_{X1,Y1}$ are zero. Hence, under inphase crisscross excitation of the traces X1 and Y1, the trace X1 has the measured capacitance $$C_{X1,finger\_on\_Y1(Y1)} \approx C_{X1,g}+C_{X1,Y2}+C_{X1,Y3}+\Delta C_{X1,g}, \quad \text{[Eq-8]}$$

under inphase crisscross excitation of the traces X1 and Y2, the trace X1 has the measured capacitance $$C_{X1,finger\_on\_Y1(Y2)} \approx C_{X1,g}+C_{X1,Y1}+C_{X1,Y3}+\Delta C_{X1,g}+\Delta C_{X1,Y1}, \quad \text{[Eq-9]}$$

and under inphase crisscross excitation of the traces X1 and Y3, the trace X1 has the measured capacitance $$C_{X1,finger\_on\_Y1(Y3)} \approx C_{X1,g}+C_{X1,Y1}+C_{X1,Y2}+\Delta C_{X1,g}+\Delta C_{X1,Y1}, \quad \text{[Eq-10]}$$

where $\Delta C_{X1,g}>0$, $\Delta C_{X1,Y1}<0$ and $|\Delta C_{X1,g}|>|\Delta C_{X1,Y1}|$.

Figure 7:
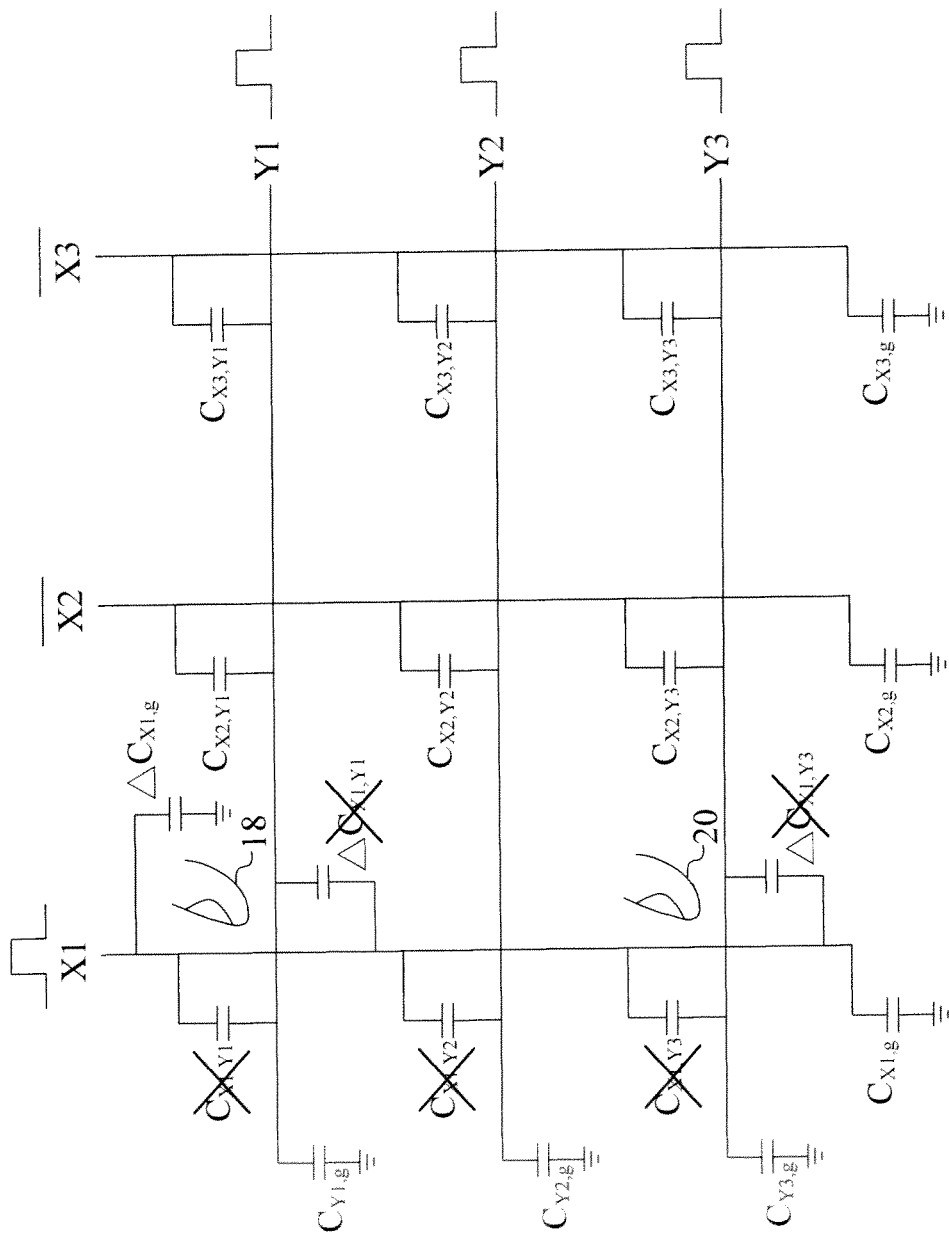
FIG. 7 is a circuit diagram of an X-Y projected capacitive touch panel with two-finger touch under being sensed for capacitance by in-phase crisscross excitation.

When two fingers 18 and 20 touch the capacitive touch panel simultaneously, as shown in FIG.FIG. 7, sequentially under inphase crisscross excitation of the traces X1 and Y1, the traces X1 and Y2, and the traces X1 and Y3, the trace X1 will have the measured capacitances $$C_{X1,finger\_on\_Y1Y3(Y1)} \approx C_{X1,g}+C_{X1,Y2}+C_{X1,Y3}+2\Delta C_{X1,g}+\Delta C_{X1,Y3}, \quad \text{[Eq-11]}$$

$$C_{X1,finger\_on\_Y1Y3(Y2)} \approx C_{X1,g}+C_{X1,Y1}+C_{X1,Y3}+2\Delta C_{X1,g}+\Delta C_{X1,Y1}+\Delta C_{X1,Y3}, \quad \text{[Eq-12]}$$

$$C_{X1,finger\_on\_Y1Y3(Y3)} = C_{X1,g} + C_{X1,Y1} + C_{X1,Y2} + 2\Delta C_{X1,g} + \Delta C_{X1,Y1},$$ [Eq-13]

where $\Delta C_{X1,g} > 0$, $\Delta C_{X1,Y1} < 0$, $\Delta C_{X1,Y3} < 0$, $|\Delta C_{X1,g}| > |\Delta C_{X1,Y1}|$ and $|\Delta C_{X1,g}| > |\Delta C_{X1,Y3}|$.

Figure 10:
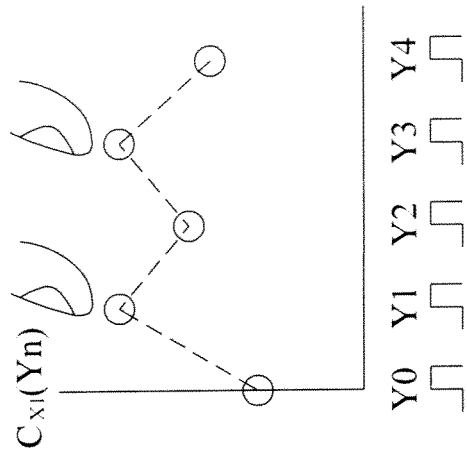
FIGS. 8 to 10 illustrate the capacitance variations of a trace caused by finger touch.
Figure 9:
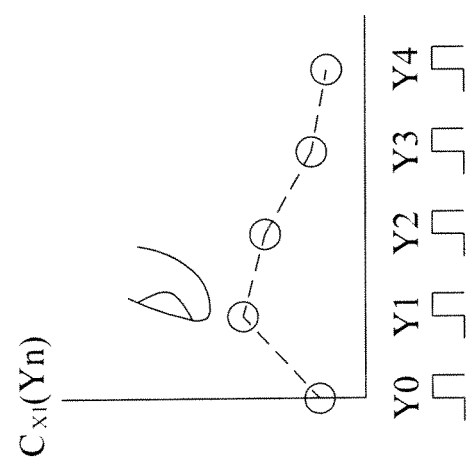
Figure 8:
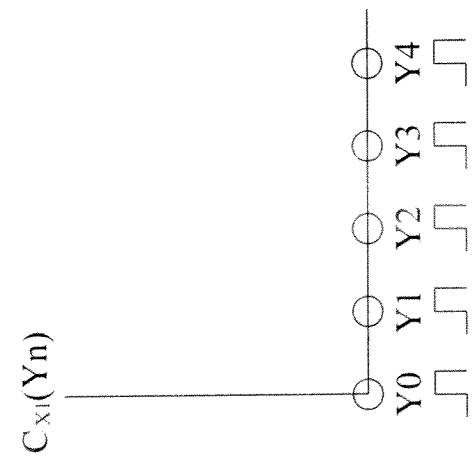

FIGS. 8 to 10 illustrate the capacitance variations of the trace X1 caused by finger touch. When no fingers approach the trace X1, as shown in FIG.FIG. 8, the capacitances at the intersections between the trace X1 and the traces Y0, Y1, Y2, Y3 and Y4 are all very small. When a finger approaches the intersection of the traces X1 and Y1, as shown in FIG.FIG. 9, a coupling capacitance is generated at the intersection and hence increases the overall capacitance of the trace X1. When the trace X1 is touched by two fingers, as shown in FIG.FIG. 10, the overall capacitance of the trace X1 is further increased, and yet the peak values at the intersections with the traces Y1 and Y3 are still apparent. Therefore, it can be known from FIGS. 8 to 10 and the equation Eq-4 that when the capacitive touch panel is touched, along the trace X1, either at touch points or at non-touch points, the capacitances are greater than the capacitance $C_{X1,no\_finger(Y1)}$ of the trace X1 in the untouched state. Besides, the more the fingers, the more the base capacitance of the trace X1 will be increased. Accordingly, the base value, which is determined according to the capacitance $C_{X1,no\_finger(Y1)}$ of the trace X1 in the untouched state, preferably increases with the finger number.

Figure 11:
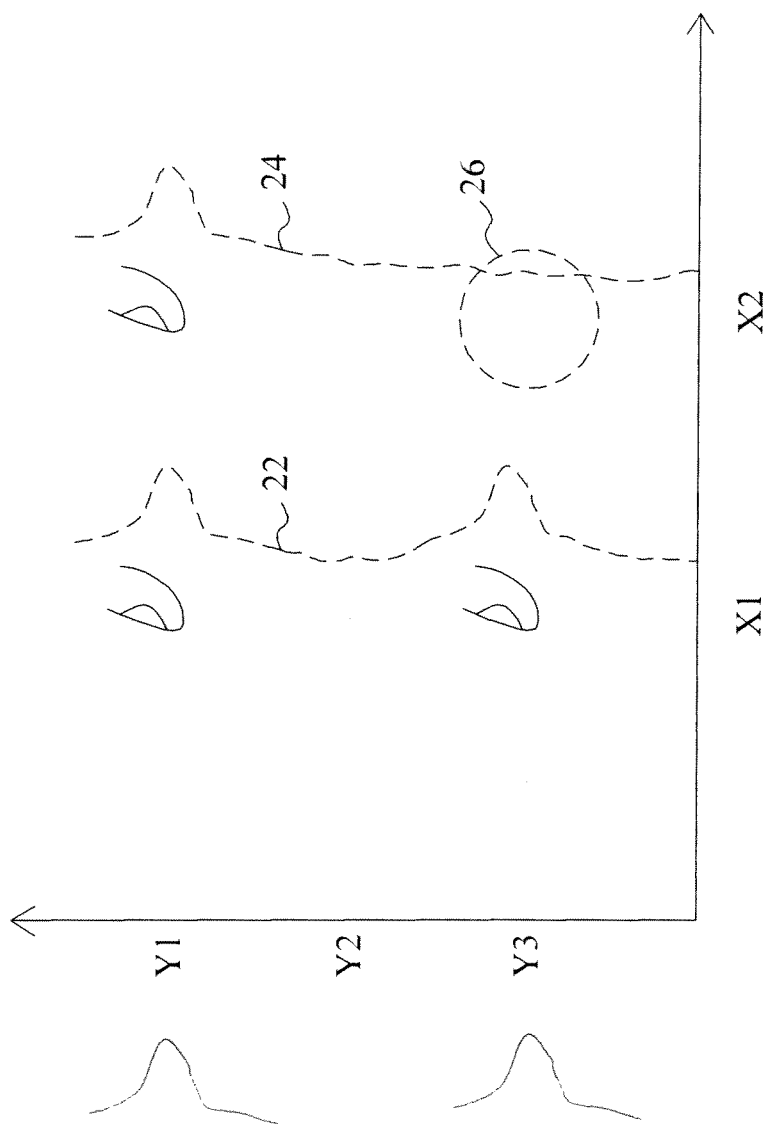
FIG. 11 schematically shows finger positioning by capacitance variation curves according to the present invention.

In addition to setting a base value as a criterion of judgment, the touch points can also be precisely identified by plotting a capacitance variation curve. The capacitance variation curve is obtained by sensing the trace X1 under inphase crisscross excitation of the two intersecting traces at each intersection along the trace X1 to obtain the capacitance at each intersection, and plotting a curve according to the capacitances obtained. Thus, an X-Y projected capacitive sensor architecture is provided with the sensing ability of its all-point counterpart. For example, when an X-Y projected capacitive touch panel is simultaneously touched by multiple fingers, as shown in FIG.FIG. 11, a ghost point 26 is present and makes it difficult to identify the real points of the fingers. For positioning the fingers, the capacitances at the intersections (X1,Y1), (X1,Y2) and (X1,Y3) are sensed by sensing the trace X1 sequentially under inphase excitation of the traces X1 and Y1, the traces X1 and Y2, and the traces X1 and Y3, and then used to plot a capacitance variation curve 22 of the trace X1, which shows that there are two fingers at (X1, Y1) and (X1,Y3) respectively. Next, by sensing the capacitance of the trace X2 sequentially under simultaneously charging the traces X2 and Y1, the traces X2 and Y2, and the traces X2 and Y3, a capacitance variation curve 24 of the trace X2 is obtained and accordingly, another finger is identified at (X2,Y1), and the position 26 is untouched and hence a ghost point.

Figure 12:
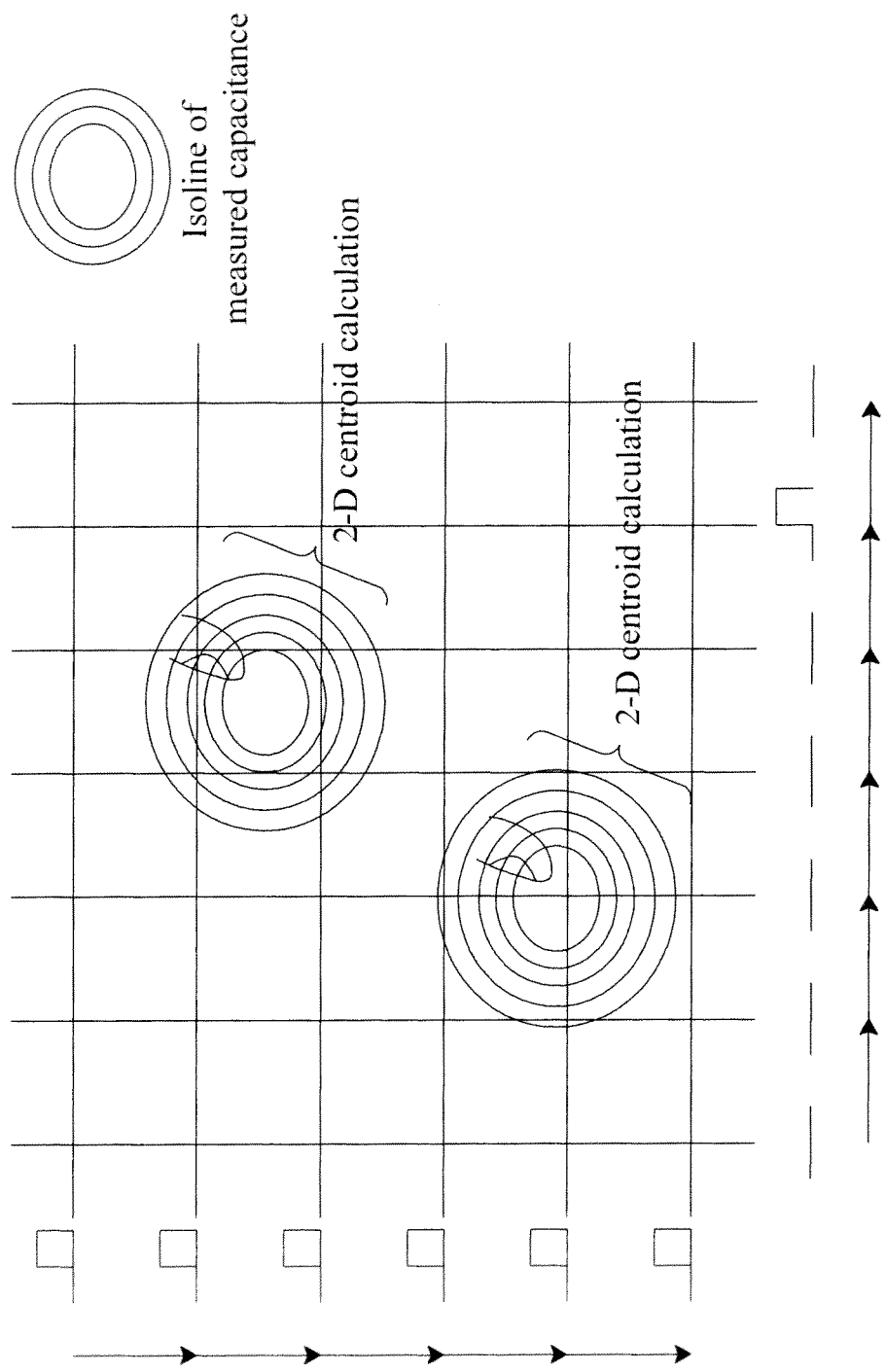
FIG. 12 schematically shows finger positioning by isolines of measured capacitances.

FIG.FIG. 12 schematically shows another approach for finger positioning on an X-Y projected capacitive touch panel, in which the foregoing procedure of capacitance sensing under in-phase crisscross excitation is applied to each intersection of the traces of the capacitive touch panel, and the measured capacitances are used to plot concentric isolines that the more inward the circles, the higher the measured capacitances. By defining the center of each group of concentric lines as the centroid of a finger, the positions of all the fingers can be identified.

While the above positioning methods are capable of achieving all-point sensing with X-Y projected capacitive sensor architecture, the amount of calculation required may be unfavorably increased. Therefore, the present invention also provides positioning methods for hybrid sensing of an X-Y projected capacitive touch panel, which are based on the conventional X-Y projected sensing and switch to all-point sensing as appropriate to reduce the amount of calculation, while generating positional information as precise as that generated by the conventional all-point sensing.

Figure 13:
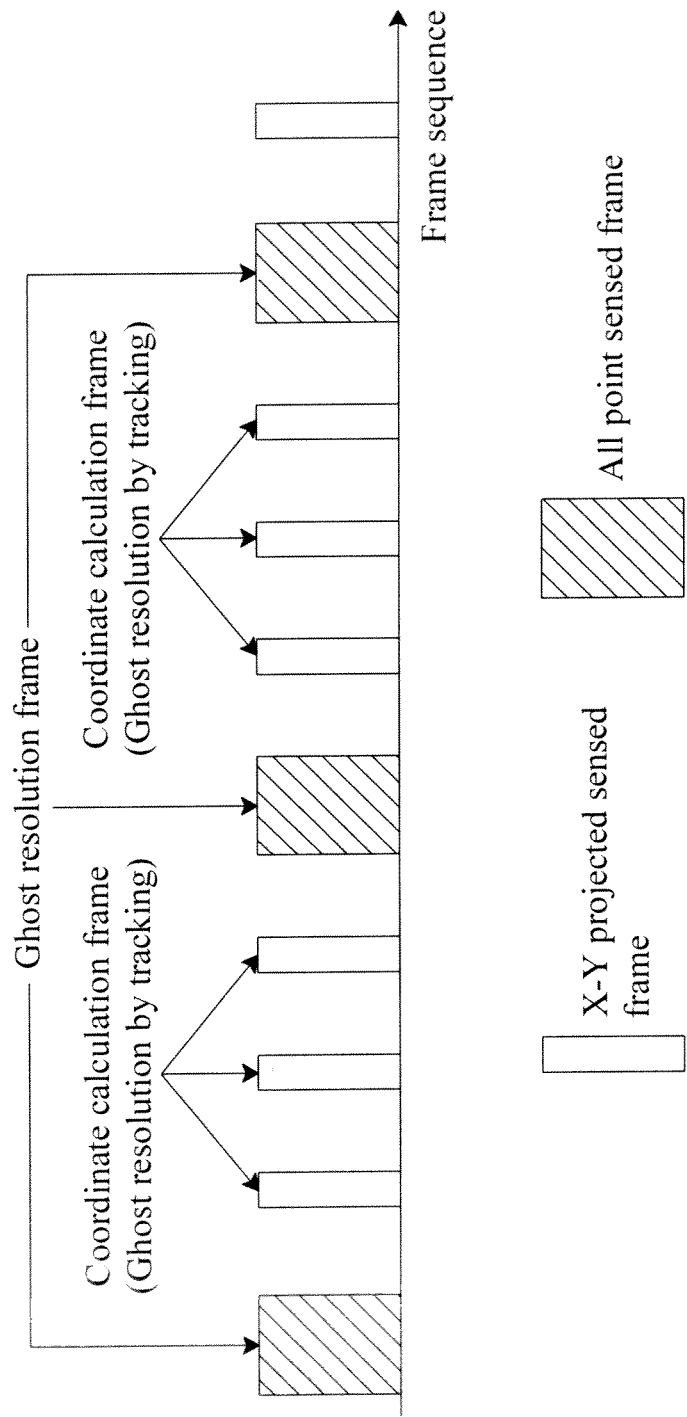
FIG. 13 illustrates a first embodiment of hybrid sensing for an X-Y projected capacitive touch panel according to the present invention.

FIG.FIG. 13 illustrates a first embodiment of hybrid sensing for an X-Y projected capacitive touch panel according to the present invention, in which blank blocks represent X-Y projected sensed frames and hatched blocks represent all-point sensed frames. In this periodic frame interleaving embodiment, each three times of X-Y projected sensing are followed by once of all-point sensing, so as not only to maintain a relatively small amount of calculation, but also to make timely correction when a ghost point is sensed, thereby accurately identifying the touch points. In other embodiments, the X-Y projected sensed frames and the all-point sensed frames may be mixed in different ways as needed.

Figure 14:
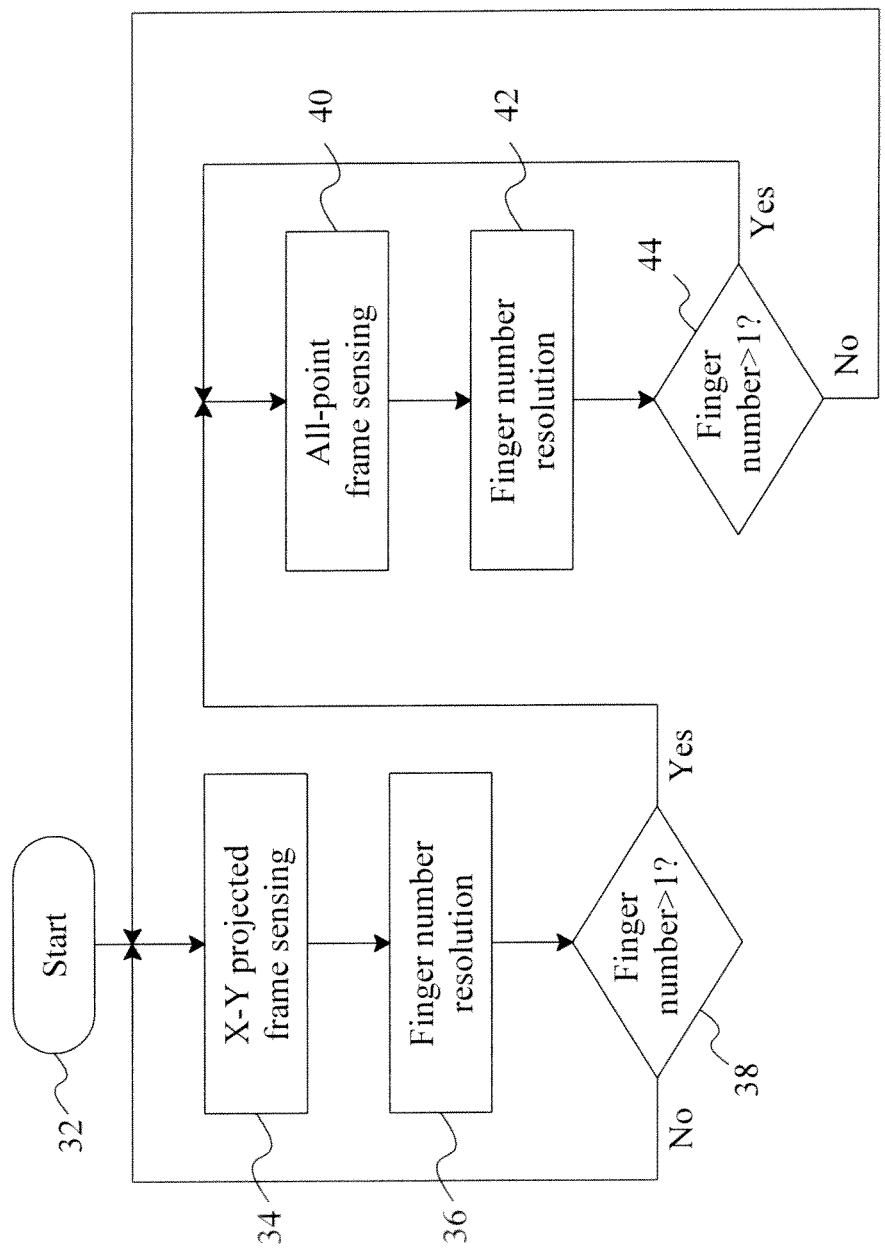
FIG. 14 is a flowchart of a second embodiment of hybrid sensing for an X-Y projected capacitive touch panel according to the present invention.

FIG.FIG. 14 is a flowchart of a second embodiment of hybrid sensing for an X-Y projected capacitive touch panel according to the present invention, in which after step 32 stars the process, step 34 carries out X-Y projected frame sensing, step 36 carries out finger number resolution, and step 38 identifies whether or not the finger number is greater than one. If not, the process returns to step 34 to generate a next X-Y projected sensed frame; if yes, the process goes to step 40 for all-point frame sensing to obtain the accurate finger positions, and step 42 carries out finger number resolution and step 44 identifies whether or not the finger number is greater than one. If yes, the process goes back to step 40 to generate a next all-point sensed frame; if not, the process returns to step 34 to generate a next X-Y projected sensed frame. This dynamic frame interleaving approach performs X-Y projected sensing and all-point sensing depending on the number of fingers.

Figure 15:
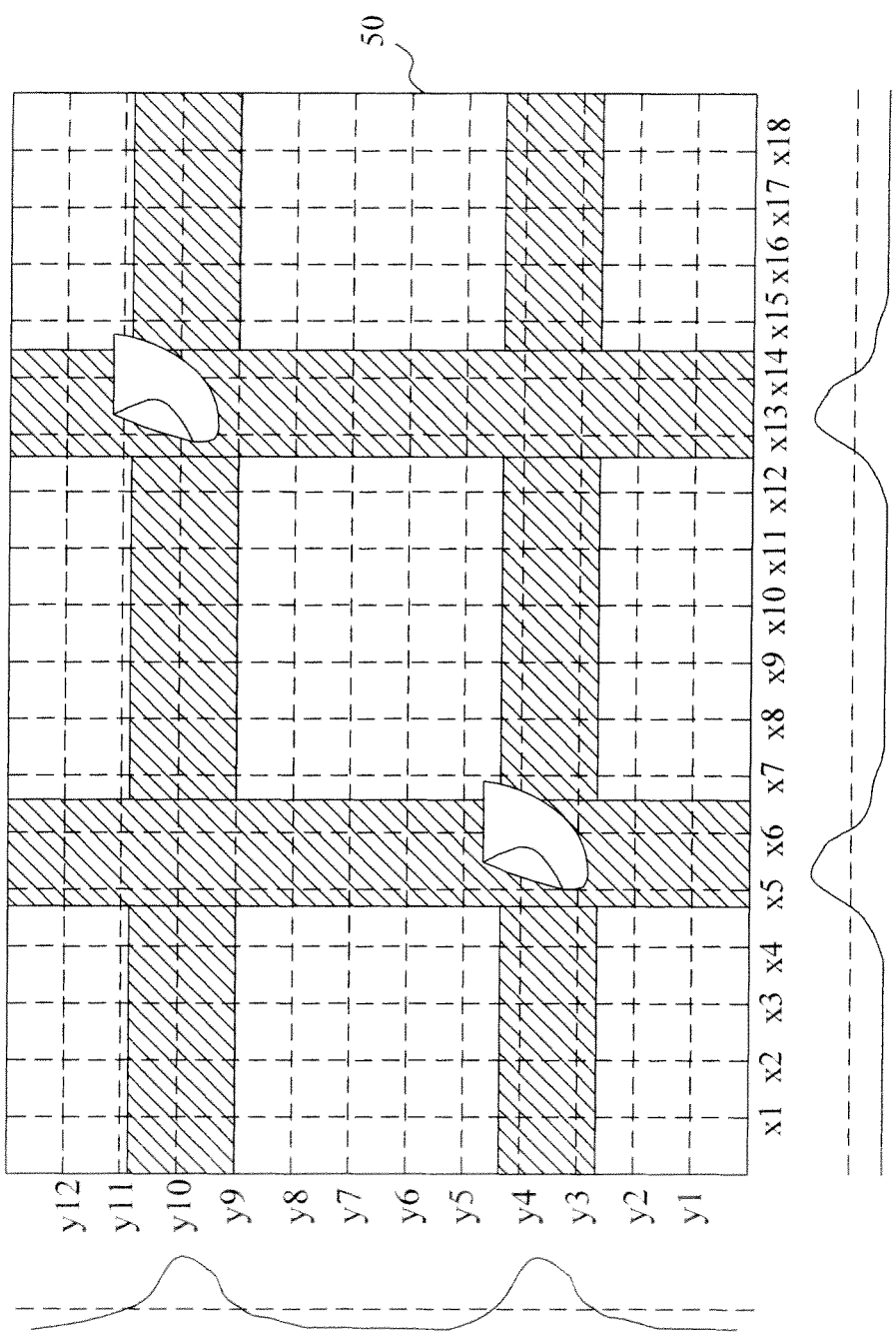
FIG. 15 illustrates a third embodiment of hybrid sensing for an X-Y projected capacitive touch panel according to the present invention.

FIG.FIG. 15 illustrates a third embodiment of hybrid sensing for an X-Y projected capacitive touch panel according to the present invention, in which a capacitive touch panel 50 includes X-traces and Y-traces represented by dashed lines. Normally, the capacitive touch panel 50 performs the conventional X-Y projected sensing, but when ghost point phenomenon is present, as shown in FIG.FIG. 15 for example, the foregoing all-point sensing is applied to traces X5, X6, X13 and X14 and traces Y3, Y4, Y9 and Y10 where the ghost points may be, so as to distinguish the real points from the ghost points.

Readers may refer to U.S. Patent Application Publication No. 20100188364 for further details of the operation and principle of the aforesaid procedure of capacitance sensing under simultaneously charging two intersecting traces.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for object positioning for an X-Y projected capacitive touch panel including a first trace and a second trace with a first intersection, the method comprising the steps of:
    (a) in a first state, supplying two excitation signals with a same phase respectively to the first and second traces simultaneously and then sensing the first trace to obtain a first measured capacitance;
    (b) setting a base value according to the first measured capacitance;

(c) in a second state, supplying two excitation signals with a same phase respectively to the first and second traces simultaneously and then sensing the first trace to obtain a second measured capacitance; and (d) comparing the base value with the second measured capacitance respectively, to identify a touch;

wherein the X-Y projected capacitive touch panel is not touched in the first state and is touched in the second state;

wherein the X-Y projected capacitive touch panel further includes a third trace and a second intersection between the first and third traces, wherein the third trace is parallel with the second trace; the step (c) further comprising: supplying two excitation signals with a same phase respectively to the first trace and third trace simultaneously and then sensing the first trace to obtain a third measured capacitance; and wherein step (d) comprises:

comparing the base value with the second and third measured capacitances respectively, to identify the touch;

concluding that the first intersection is touched if the second measured capacitance is greater than the base value;

concluding that the second intersection is touched if the third measured capacitance is greater than the base value; and concluding that the first and second intersections are touched if both the second and third measured capacitances are greater than the base value.

2. The method of claim 1, wherein the step (b) comprises the step of increasing the base value with a number of objects on the X-Y projected capacitive touch panel increases.

\* \* \* \* \*